(12) United States Patent
Shultz et al.

(10) Patent No.: US 8,403,813 B2
(45) Date of Patent: Mar. 26, 2013

(54) ENGAGEMENT/DISENGAGEMENT OF TRANSMISSION WITH AUXILIARY GEARBOX

(75) Inventors: Jeffrey E. Shultz, Zionsville, IN (US); Scott Mundy, Carmel, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

(21) Appl. No.: 13/550,443

(22) Filed: Jul. 16, 2012

(65) Prior Publication Data
US 2012/0279326 A1    Nov. 8, 2012

Related U.S. Application Data

(63) Continuation of application No. 12/403,503, filed on Mar. 13, 2009, now Pat. No. 8,221,289.

(60) Provisional application No. 61/037,527, filed on Mar. 18, 2008.

(51) Int. Cl.
*B60W 10/02* (2006.01)
*B60W 10/04* (2006.01)
(52) U.S. Cl. .......................................... 477/180; 74/11
(58) Field of Classification Search .............. 477/34, 477/51, 70, 79, 86, 174, 180; 74/11, 15.66, 74/15.86, 15.88, 339
See application file for complete search history.

(56) References Cited

U.S. PATENT DOCUMENTS

| | | | |
|---|---|---|---|
| 5,860,499 A | 1/1999 | Onimaru et al. | |
| 6,003,391 A | 12/1999 | Kojima et al. | |
| 8,135,520 B2 * | 3/2012 | Shultz et al. | 701/51 |
| 8,205,516 B2 * | 6/2012 | Kobayashi et al. | 74/331 |
| 8,221,289 B2 | 7/2012 | Shultz et al. | |
| 2009/0031699 A1 | 2/2009 | Landes et al. | |
| 2012/0160045 A1 * | 6/2012 | Shultz et al. | 74/335 |

* cited by examiner

*Primary Examiner* — Justin Holmes
(74) *Attorney, Agent, or Firm* — Barnes & Thornburg LLP

(57) ABSTRACT

Embodiments which selectively engage a motor with auxiliary equipment and a final drive assembly of the motor vehicle are disclosed. A transmission of such a motor vehicle may include a transmission input shaft to receive power from the motor, a transmission output shaft, and clutches and associated gears that define power delivered by the transmission output shaft based upon power received by the transmission input shaft. An auxiliary gearbox may include a transmission input gear associated with the transmission output shaft, an equipment output gear to power the auxiliary equipment, and a drive output gear to power the final drive assembly. The motor vehicle may further include a transmission control module to engage the transmission input gear with the equipment output gear by transitioning among locking the transmission output shaft, disengaging the clutches to reduce torque on the transmission output shaft, and placing the transmission in an unlocked neutral state.

20 Claims, 4 Drawing Sheets

ENGAGEMENT/DISENGAGEMENT OF TRANSMISSION WITH AUXILIARY GEARBOX

CROSS-REFERENCE TO RELATED APPLICATIONS

The present application is a continuation application of U.S. application Ser. No. 12/403,503, entitled "ENGAGEMENT/DISENGAGEMENT OF TRANSMISSION WITH AUXILIARY GEARBOX," which was filed on Mar. 13, 2009 and which claims the benefit under 35 U.S.C. §119(e) to of U.S. Application Ser. No. 61/037,527, which was filed Mar. 18, 2008, the entirety of both of which is hereby incorporated by reference.

BACKGROUND

Commercial vehicles such as fire trunk pumpers, sewer cleaners, and oil field pumpers include an auxiliary gearbox or transfer case that is connected to the output shaft of the vehicle's transmission. In auxiliary equipment mode, the transfer case drives the auxiliary equipment, and the transmission controller provides a secondary mode of operation. A secondary mode of operation could be a single forward range or all ranges with a shift schedule specific to the auxiliary equipment.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DESCRIPTION OF THE PREFERRED EMBODIMENT

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and others.

Figure 1:
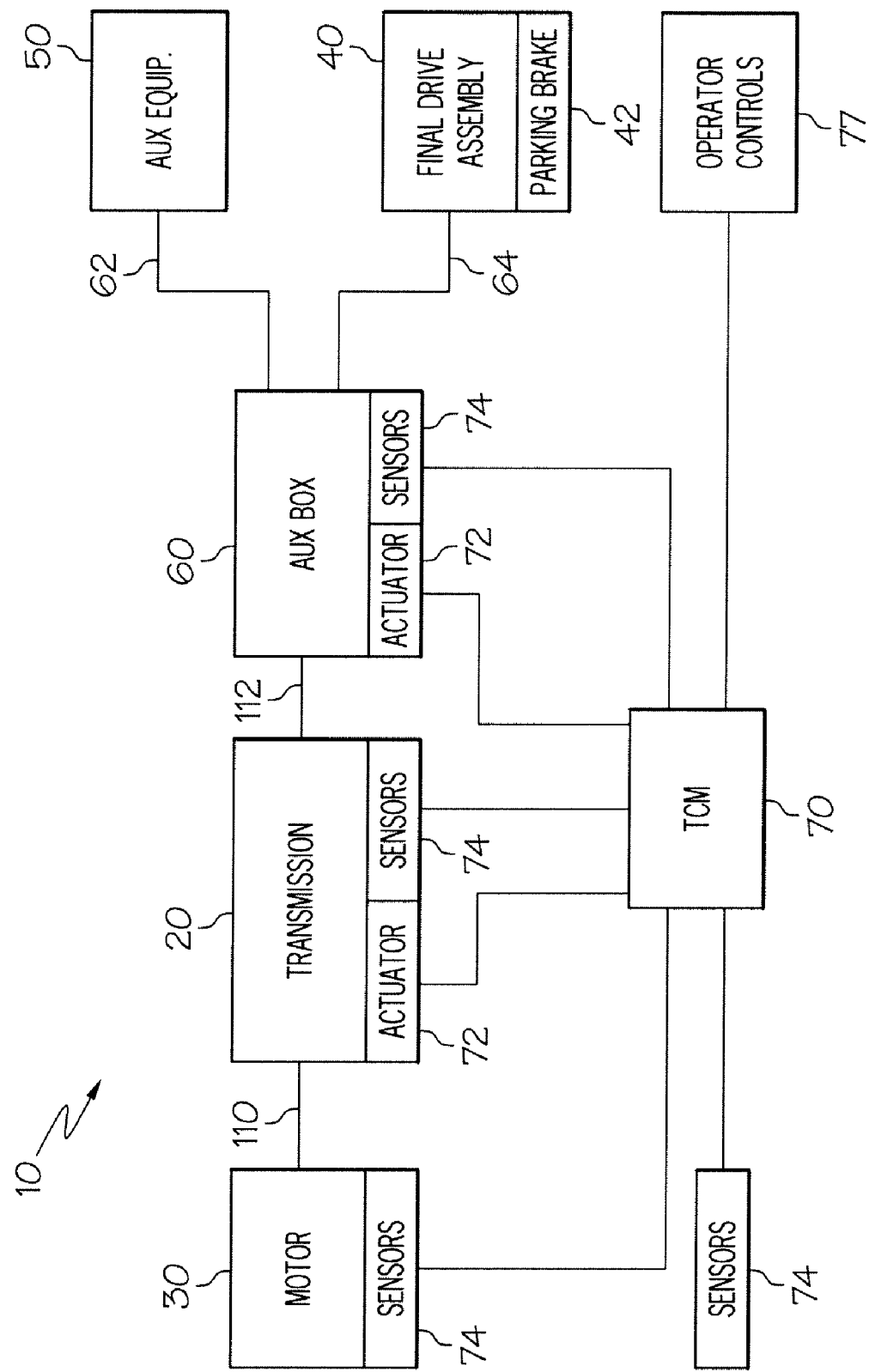
FIG. 1 shows an embodiment of a motor vehicle.
Figure 2:
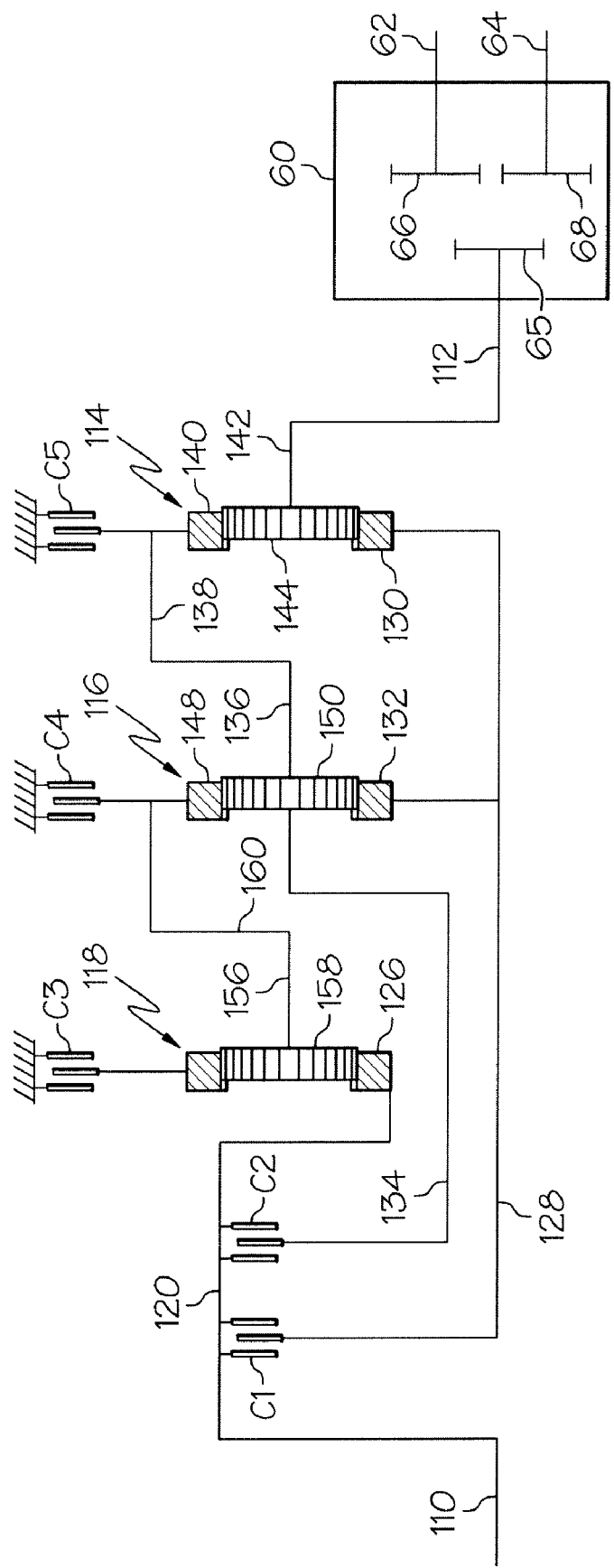
FIG. 2 shows details regarding an embodiment of a transmission and an auxiliary gearbox of the motor vehicle of FIG. 1.

Referring now to FIGS. 1 and 2, a motor vehicle 10 and relevant transmission details are shown. The motor vehicle 10 includes a transmission 20 that provides a torque-speed conversion from a generally higher speed motor 30 to a slower but more forceful output such as the final drive assembly 40 and the auxiliary equipment 50. The final drive assembly 40 may include drive wheels, caterpillar tracks, propels, etc. that impart the motor vehicle 10 with locomotion when driven by the motor 30 via the transmission 20. The final drive assembly 40 may further have a parking brake 42 associated therewith that upon being applied brakes the final drive assembly 40 to prevent locomotion. The auxiliary equipment 50 may include a fire truck pump, a oil rig pump, a sewer cleaner pump or some other equipment driven by the motor 30.

As shown, the motor 30 is coupled to an input shaft 110 of the transmission 20 to provide power to the transmission 20. An output shaft 112 of the transmission 20 is coupled to an auxiliary gearbox 60 to provide power to the auxiliary gearbox 60. An equipment input shaft 62 associated with an equipment output gear 66 of the auxiliary gearbox 60 is coupled to the auxiliary equipment 50 to provide power to the auxiliary equipment 50. Similarly, a drive input shaft 64 of the auxiliary gearbox 60 is coupled to the final drive assembly 40 to provide power to the final drive assembly 40. As explained in more detail below, the auxiliary gearbox 60 selectively couples the output shaft 112 of the transmission 20 to the equipment input shaft 62 and the drive input shaft 64 such that at most one of the input shafts 62, 64 is engaged with motor 30 via the transmission 20.

The motor vehicle 10 further includes a transmission control module (TCM) 70 that is coupled to actuators 72 (e.g. hydraulic solenoids) associated with the transmission 20 and the auxiliary gearbox 60 to selectively control clutches C1-C5 of the transmission 20 and engagement of the transmission output shaft 112 with output gears 66, 68 of the auxiliary gearbox 60. The TCM 70 is further connected to various sensors 74 of the motor vehicle 10 that provide the TCM 70 with various operating conditions associated with operation of the transmission 20, motor 30 and auxiliary gearbox 60. In particular, the sensors 74 in one embodiment include a full engagement sensor that provides the TCM 70 with a signal indicative of whether the auxiliary gearbox 60 has fully engaged the transmission input gear 65 associated with the transmission output shaft 112 with the equipment output gear 66 associated with the equipment input shaft 62.

The TCM 70 may be implemented using analog and/or digital circuit components. In one embodiment, the TCM 70 may include a processor such as a microcontroller or microprocessor and one or more memory devices such as read only memory devices, flash memory device, random access memory devices, and/or other storage devices that store instructions to be executed and data to be processed by the processor of the TCM 70.

The motor vehicle 10 may further include operator controls 77. The operator controls 77 may include various levers, switches, pedals, buttons, wheels, lights, dials, etc. which an operator of the motor vehicle 10 may actuate in order to control operation of the motor vehicle 10 and may monitor in order to confirm operation of the motor vehicle 10.

Additional details of the transmission 20 are shown in FIG. 2. As shown, the transmission 20 comprises three planetary gear sets 114, 116, and 118 disposed between the input shaft 110 and the output shaft 112. The transmission 20 further includes five clutches C1-C5. In one embodiment, the first clutch C1 and second clutch C2 are implemented using rotating clutches, and the third clutch C3, fourth clutch C4, and fifth clutch C5 are implemented using stationary clutches or brakes.

The input shaft 110 is drivingly connected to a drum 120 that provides input drives for clutches C1 and C2. The drum 20 is also drivingly connected to a sun gear 126 of the gear set 118. In one embodiment, the input shaft 110 is driven by a conventional torque converter, not shown, which is driven by the motor 30. The output shaft 112 drives the auxiliary gearbox 60 to transfer torque to the final drive assembly 40 and the auxiliary equipment 50.

The first clutch C1 is connected to a shaft 128 which in turn is connected to sun gears 130 and 132 of the gear sets 114 and 116 respectively. The second clutch C2 is connected to a shaft 134 which is connected to a planet carrier 136 of gear set 116. The planet carrier 136 is connected through a hub 138 to a ring gear 140 of gear set 114.

The planetary gear set 114 also includes a planet carrier 142 on which is rotatably mounted a plurality of pinion gears 144, only one of which is shown, meshing with the sun gear 130 and ring gear 140. The ring gear 140 is operatively connected to the fifth clutch C5, which may be selectively engaged to restrain rotation of the ring gear 140 and carrier 136. The planet carrier 142 is drivingly connected to the output shaft 112, and thus the auxiliary gearbox 60.

The planetary gear set 116 further includes a ring gear 148 and a plurality of pinion gears 150 rotatably mounted on carrier 136 and meshing with sun gear 132 and ring gear 148. The ring gear 148 is operatively connected to the fourth clutch C4 which may be selectively engaged to restrain rotation of the ring gear 148.

The planetary gear set 118 includes a ring gear 154, a planet carrier 156 and a plurality of pinion gears 158, which are rotatably mounted on carrier 156 and mesh with sun gear 126 and ring gear 154. The carrier 156 is drivingly connected to a hub 160, which is connected to ring gear 148. The ring gear 154 is operatively connected to the third clutch C3, which may be selectively engaged to restrain rotation of ring gear 154.

The stationary and rotational clutches C1-C5 in one embodiment are of a multiple disc type, which are commonly used in planetary gear transmissions. Alternatively, the stationary clutches C1-C5 may be band-type brakes. The construction, operation, and control of these devices are well known to those familiar with the art of power transmissions such that a detailed description of these units is not considered necessary.

The TCM 70 may control the gearing arrangement by generating control signals that selectively actuate the actuators 72 in order to selectively engage and disengage associated clutches C1-C5. As shown in Table 1, the clutches C1-C5 may be engaged/disengaged to provide six forward drive ratios and one reverse drive ratio. In Table 1, an "X" indicates the respective clutch C1-C5 is engaged and the absence of an "X" indicates the respective clutch C1-C5 is disengaged.

TABLE 1

|  | C1 | C2 | C3 | C4 | C5 |
|---|---|---|---|---|---|
| NEUTRAL NO CLUTCH (NNC) |  |  |  |  |  |
| NEUTRAL-UNLOCKED |  |  |  |  | X |
| NEUTRAL-LOCKED |  |  |  | X | X |
| FIRST | X |  |  |  | X |
| SECOND | X |  |  | X |  |
| THIRD | X |  | X |  |  |
| FOURTH | X | X |  |  |  |
| FIFTH |  | X | X |  |  |
| SIXTH |  | X |  | X |  |
| REVERSE |  |  | X |  | X |

The Table 1 illustrates the combination of engaged clutches C1-C5 to establish the drive ratios. In particular, FIRST gear is established by the engagement of the first clutch C1 and fifth clutch C5. SECOND gear is established by the disengagement of the fifth clutch C5 and the substantially simultaneous engagement of the fourth clutch C4. To establish THIRD gear, the fourth clutch C4 is disengaged as the third clutch C3 is engaged. FOURTH gear is established by disengaging the third clutch C3 while engaging the second clutch C2. To establish FIFTH gear, the first clutch C1 is disengaged as the third clutch C3 is substantially simultaneous engaged. The SIXTH gear is established by disengagement of the third clutch C3 and simultaneous engagement of the fourth clutch C4. The REVERSE gear is established by engagement of the third clutch C3 and the fifth clutch C5.

Besides the above described drive gear states, the transmission 20 also has a NEUTRAL-UNLOCKED state when only the fifth clutch C5 is engaged. Further, the transmission 20 has a NEUTRAL-LOCKED state when only the fourth and fifth clutches C4 and C5 are engaged and a NEUTRAL NO CLUTCH (NC) state when none of the clutches C1-C5 are engaged.

From the foregoing description of the drive gear ratios, each ratio requires the engagement of different combinations of two of the five clutches C1-C5. Further, the interchange between successive forward ratios is accomplished by the disengagement of one of the clutches (the off-going clutch) and the substantially simultaneous engagement of a second clutch (the on-coming clutch) while maintaining another clutch engaged during the transition.

The TCM 70 may lock the output shaft 112 to prevent rotation of the output shaft 112. In the planetary arrangement of the transmission 20 described above, the TCM 70 may lock the output shaft 112 by engaging both the fourth clutch C4 and fifth clutch C5. Engagement of the fifth clutch C5 holds the ring gear 140 of gear set 114, as well as the pinion gears 150 of gear set 116. Engagement of the fourth clutch C4 holds the ring gear 148 of gear set 116 which, in conjunction with the held pinion gears 150, restricts rotation of the sun gear 132. Since the sun gear 132 is restricted, the sun gear 130 of gear set 114 is also kept from rotating. The end result is the planet carrier 142 of gear set 114 is locked from rotation as is the transmission output shaft 112.

Figure 3:
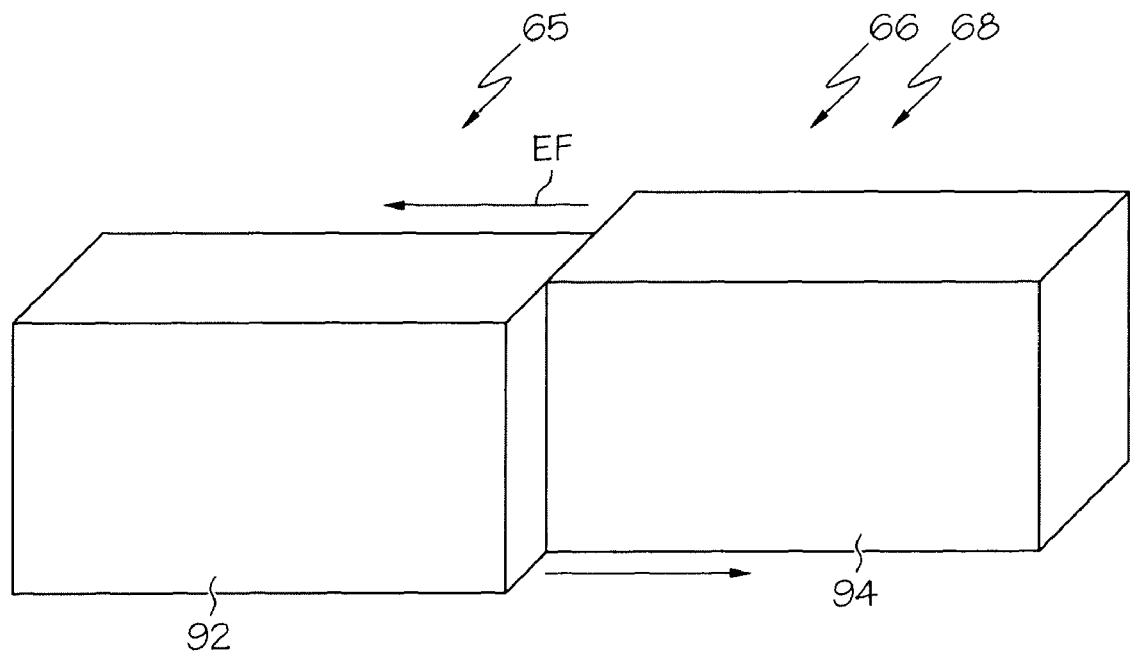
FIG. 3 shows a gear-clash condition.

As shown, the auxiliary gearbox 60 includes transmission input gear 65, equipment output gear 66 and drive output gear 68 respectfully coupled to or otherwise associated with the transmission output shaft 112, equipment input shaft 62, and drive input shaft 64. The TCM 70 via one or more actuators 72 (See, FIG. 1) may selectively engage the transmission input gear 65 associated the transmission output shaft 112 with either the equipment output gear 66 associated with the equipment input shaft 62 or the drive output gear 68 associated with the drive input shaft 64. In one embodiment, the TCM 70 may lock the transmission output shaft 112 by engaging clutches C4 and C5 as described above in order to prevent rotation of the shaft 112. The TCM 70 may then activate the actuator 72 to engage the transmission input gear 65 associated with the locked shaft 112 with one of the output gears 66, 68. However, as shown in FIG. 3, teeth 92 of the transmission input gear 65 may not align with teeth 94 of the output gears 66, 68 resulting in a gear-clash condition. In one embodiment, the actuators 72 are unable to overcome gear-clash on their own. In such an embodiment, operators of the motor vehicle 10 may attempt to eliminate gear-clash by selecting drive or reverse in order to rotate the transmission input gear 65 associated with the transmission output shaft 112 in a hope that once the TCM 70 again locks the transmission output shaft 112 that the teeth 92 of the input gear 65 align with the teeth 94 of the output gear 66 or 68.

Engagement of clutch C5 and disengagement of the other clutches C1-C4 (i.e. the NEUTRAL state of Table 1) results in the transmission 20 delivering a low amount of torque to the transmission output shaft 112. The torque is a result of drag on other disengaged clutches C1-C4 and in particular the third clutch C3. As shown, in Table 1, engagement of clutches C3 and C5 corresponds to the REVERSE gear. Thus, the drag exhibited by the third clutch C3 in the NEUTRAL state results in the output shaft 112 slowly rotating in reverse. In light of this slow reverse rotation while the transmission 20 is in NEUTRAL state, the TCM 70 in one embodiment cycles the transmission 20 between a NEUTRAL-LOCKED state (i.e. engagement of clutches C4 and C5) and a NEUTRAL-UNLOCKED state (i.e. engagement of only clutch C5) while activating the actuator 72 associated with engaging the input gear 65 with the output gear 66 or 68.

Figure 4:
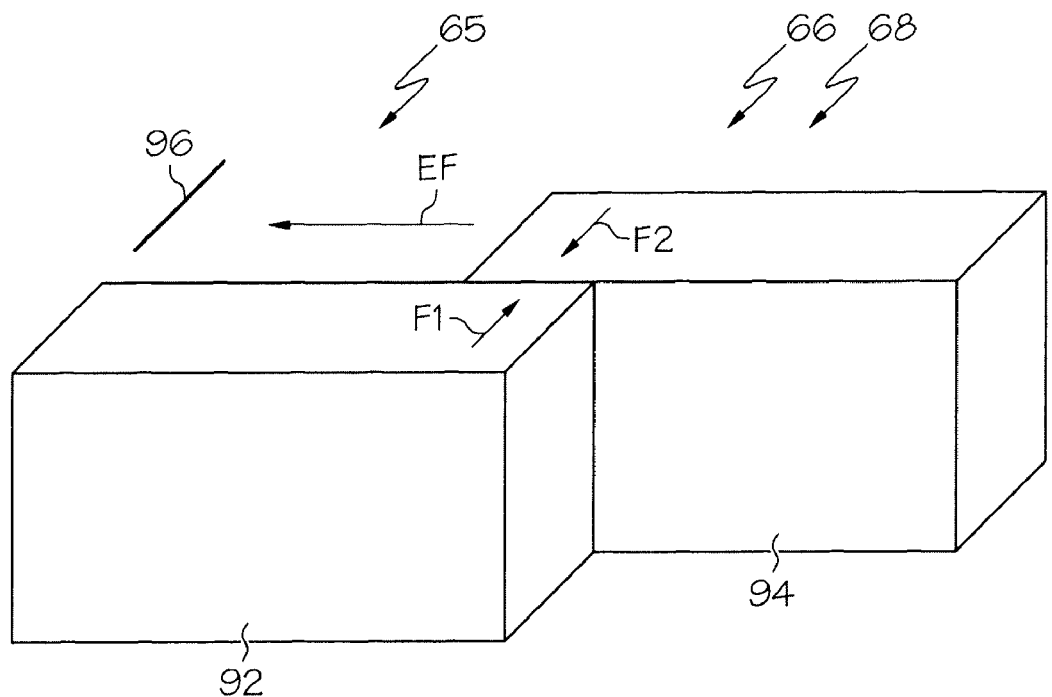
FIG. 4 shows a butt-tooth condition.

Ideally, such cycling between unlocking the output shaft 112 and locking the output shaft 112 results in the teeth 92 of the input gear 65 aligning with the teeth 94 of the output gear 66 or 68 such that the actuators 72 may fully engage the input gear 65 with one of the gears 66, 68. However, as depicted in FIG. 4, a butt-tooth condition may still arise. The butt-tooth condition corresponds to a condition in which after the teeth 92 of the input gear 65 align with and partially engage the teeth 94 of the output gear 66 or 68, the teeth 92 still do not fully engage due to torque on the gear teeth. As mentioned above, drag exhibited by the third clutch C3 in NEUTRAL state results in the output shaft 112 slowly rotating in reverse. The transmission drag torque may result in opposing forces F1, F2 between the teeth 92, 94 that prevent the actuator 72 from sliding the gear teeth 92, 94 to a point of full engagement as represented by full engagement line 96. Basically, locking and unlocking the transmission output shaft 112 may account for speed and location of the gear teeth 92, 94, but may not adequately address the torque still being applied to the transmission output shaft 112 by the dragging, disengaged clutches C1-C4 and in particular the drag exhibited by the disengaged third clutch C3.

To overcome the above "butt tooth" condition, the TCM 70 introduces a NEUTRAL NO CLUTCH (NNC) state in which the TCM 70 disengages all clutches C1-C5 which significantly reduces any torque on the output shaft 112 resulting from drag on the clutches C1-C5 to zero or near zero. The TCM 70 may take advantage of the NNC state to fully engage the input gear 65 of the output shaft 112 with one of the gears 66, 68 as shown in the process 300 of FIG. 5. In one embodiment, the TCM 70 executes the engagement process 300 of FIG. 5 in response to a request to engage the input gear 65 of the auxiliary gearbox 60. In particular, the TCM 70 may receive a request to engage the input gear 65 to the gear 68 of the drive input shaft 64 in order to permit the transmission 20 to drive the final drive assembly 40 and impart locomotion to the motor vehicle 10. Conversely, the TCM 70 may receive a request to engage the input gear 65 to the output gear 66 of the auxiliary output shaft 66 in order to permit the transmission 20 to drive the auxiliary equipment 50 such as a fire truck pump, oil rig pump or the like.

Figure 5:
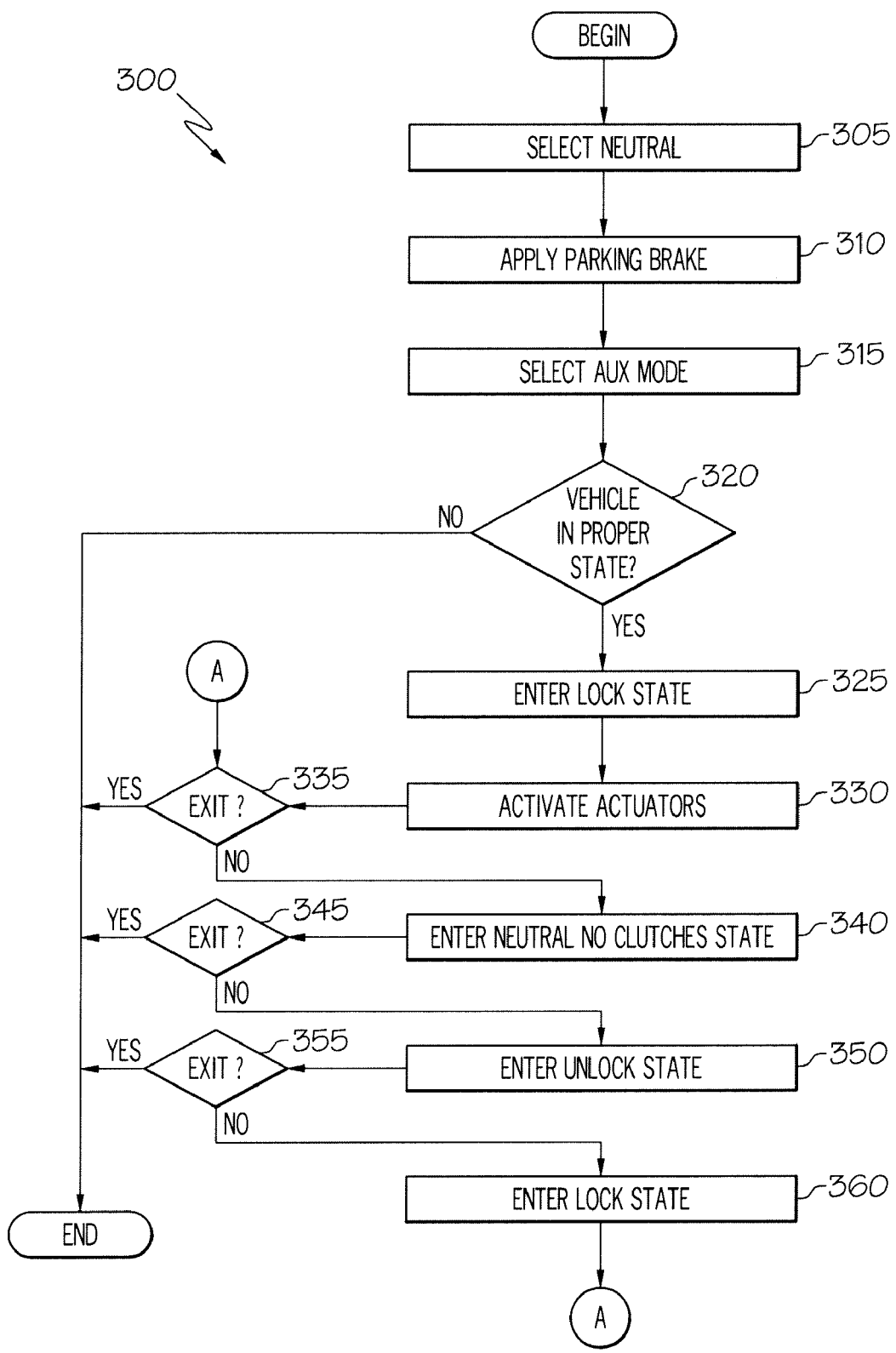
FIG. 5 shows an embodiment of a process for engaging a transmission input gear of the auxiliary gearbox with an output gear of the auxiliary gearbox.

To simplify the following description of the engagement process 300 of FIG. 5, it is assumed that the operator has requested the TCM 70 to engage the auxiliary equipment 50 with the transmission 20 via the auxiliary gearbox 60, thus resulting in the disengagement of the final drive assembly 40. However, the following description is also applicable to engagement of the transmission 20 with the final drive assembly 40, thus resulting in the disengagement of the auxiliary equipment.

As shown in FIG. 5, the engagement process 300 begins with the operator of the motor vehicle 10 at block 305 selecting the NEUTRAL state via operator controls 77 of the motor vehicle which result in the TCM 70 placing the transmission in NEUTRAL state. In particular, the TCM 70 in response to the operator controls 77 activates actuators 72 of the transmission 20 to engage clutch C5 and disengage the other clutches C1-C4. The operator at block 310 may apply the parking brake 42 via the operator controls 77, thus resulting in the locking of the final drive assembly 40 to prevent locomotion. The operator at block 315 may select an auxiliary mode (e.g. a fire truck pump mode) via a switch of the operator controls 77 which activates a sensor 74 that identifies the request to TCM 70.

In response to receiving the request, the TCM 70 verifies at block 320 whether the motor vehicle 10 is in an appropriate state to initiate the engagement of the auxiliary equipment 50. For example, the TCM 70 may verify that the transmission 20 is in NEUTRAL state and the parking brake is applied. If the motor vehicle 10 is not in an appropriate state, the TCM 70 at block 325 may exit the engagement process 300 and may provide the operator with an indication that the requested engagement has been aborted. For example, the TCM 70 may generate one or more control signals that generate an audible signal, extinguish an illuminated light of the operator controls 77, or result in some other operator observable indication.

In response to determining that the motor vehicle 10 is in an appropriate state to initiate engagement of the auxiliary equipment 50, the TCM 70 at block 325 may lock the transmission output shaft 112. In particular, the TCM 70 may active actuators 72 of the transmission 20 to engage clutch C4 thus resulting in the transmission 20 transitioning from a NEUTRAL-UNLOCKED state where only clutch C5 is engaged to a NEUTRAL-LOCKED state where both clutches C4 and C5 are engaged.

At block 330, the TCM 70 may activate actuators 72 of the auxiliary gearbox 60 to align the input gear 65 with the selected output gear 66 of the equipment input shaft 62 and to introduce an engagement force EF that attempts to engage the input gear 65 and the selected output gear 66.

At block 335, the TCM 70 may determine whether to exit the process 300 of engaging the input gear 65 with the selected output gear 66. In one embodiment, a sensor 74 of the transmission 20 generates a signal that indicates whether the output gear 66 of the equipment input shaft 62 has fully engaged the input gear 65 of the transmission output shaft 112. Accordingly, the TCM 708 in one embodiment may determine to exit the engagement process 300 in response to the signal indicating full engagement of the input gear 65 with the output gear 66. The TCM 70 may further determine to exit the process 300 after a predetermined period of time (e.g. 1 or 2 minutes) has elapsed since beginning the engagement process 300, thus essentially assuming that the gears 65, 66 are fully engaged after such time has past. The TCM 70 may also determine to exit the process 300 in response to an operator requesting via operator controls 77 to place the transmission 20 into a drive gear (e.g. REVERSE gear or FIRST gear).

If TCM 70 determines not to exit the engagement process, then a butt-tooth condition may be preventing full engagement of the gears 65, 66. As such, the TCM 70 at block 340 may reduce torque on the transmission output shaft 112 and opposing forces F1, F2 between teeth 92, 94 by placing the transmission 20 in the NEUTRAL-NO-CLUTCHES (NNC) state. In particular, the TCM 70 may generate control signals which cause actuators 72 associated with the fourth and fifth clutches C4 and C5 to disengage the fourth and fifth clutches C4 and C5 thus resulting in none of the clutches C1-C5 being engaged. Transmission of any drag on the disengaged clutches C1-C5 to the transmission output shaft 112 is thereby greatly reduced which in turn reduces the opposing force F1, F2 between the teeth 92,94.

At block 345, the TCM 70 may again determine whether to exit the process 300 in a manner similar to above 335 block. If the TCM 70 decides not to exit the process 300, a gear-clash condition may be preventing the full engagement of the gears 65, 66. As such, the TCM 70 at block 350 may unlock the transmission output shaft 112 by activating actuators 72 of the transmission 20 to place the transmission 20 in a NEUTRAL state. In particular, the TCM 70 may generate control signals which cause actuators 72 associated with the fifth clutch C5 to engage the fifth clutch C5 thus resulting in only the fifth clutch C5 being engaged. Drag on the disengaged third clutch C3 may slowly rotate the transmission output shaft 112 in reverse in an attempt to further align teeth 92, 94 of the gears 65, 66 and to resolve the gear-clash condition.

At block 355, the TCM 70 may determine whether to exit the process 300 in a manner similar to block 335. If the TCM 70 determines not to exit the process 300, then the TCM 70 at block 360 may lock the transmission 20 again to stop rotation of the transmission output shaft 112. The TCM 70 may then return to block 335 to determine whether the gears 65, 66 are fully engaged, and, if not, may transition through the LOCK, NNC, and UNLOCK states until the gears 65, 66 are fully engaged or the TCM 70 otherwise decides to exit the process 300.

While the disclosure has been illustrated and described in detail in the drawings and foregoing description, such an illustration and description is to be considered as merely illustrative and not restrictive in character, it being understood that only illustrative embodiments have been shown and described and that all changes and modifications that come within the spirit of the disclosure are desired to be protected.

What is claimed is:

1. A method for controlling an auxiliary gearbox used to selectively couple auxiliary equipment and a final drive assembly of a motor vehicle to a motor via a transmission, the method comprising:

receiving a request to switch engagement of a transmission input gear associated with a transmission output shaft driven by the transmission from a first output gear of the auxiliary gearbox to a second output gear of the auxiliary gearbox; and engaging the transmission input gear and the second output gear of the auxiliary gearbox by (i) locking the transmission, in response to the request, to stop rotation of the transmission output shaft, (ii) determining whether the transmission input gear and the second output gear are fully engaged in response to locking the transmission; (iii) disengaging all clutches of the transmission to reduce torque on the transmission output shaft in response to determining that the transmission input gear and the second output gear are not fully engaged; (iv) determining whether the transmission input gear and the second output gear are fully engaged in response to disengaging all clutches of the transmission; and (v) placing the transmission in an unlocked neutral state, in which one clutch of the transmission is engaged, to rotate the transmission output shaft and the associated transmission input gear with respect to the second output gear in response to determining that the transmission input gear and second output gear are not fully engaged after disengaging all clutches of the transmission.

2. The method of claim 1, wherein receiving the request comprises receiving a request to switch engagement of the transmission output shaft from a first output gear of the auxiliary gearbox associated with a drive input shaft used to drive the final drive assembly of the motor vehicle to a second output gear of the auxiliary gearbox associated with an equipment input shaft used to drive the auxiliary equipment of the motor vehicle.

3. The method of claim 1, wherein receiving the request comprises receiving a request to switch engagement of the transmission output shaft from a first output gear of the auxiliary gearbox associated with an equipment input shaft used to drive the auxiliary equipment of the motor vehicle to a second output gear of the auxiliary gearbox associated with a drive input shaft used to drive the final drive assembly of the motor vehicle.

4. The method of claim 1, wherein engaging the transmission input gear and the second output gear of the auxiliary gearbox comprises transitioning among the locking of the transmission, the disengaging of all clutches, and the placing of the transmission in the unlocked neutral state until the transmission input gear and the second output gear are fully engaged.

5. The method of claim 1, wherein determining whether the transmission input gear and the second output gear are fully engaged comprises determining whether the transmission input gear and the second output gear are fully engaged as a function of a sensor signal that indicates the transmission input gear and the second output gear are fully engaged.

6. The method of claim 1, wherein determining whether the transmission input gear and the second output gear are fully engaged comprises determining whether the transmission input gear and the second output gear are fully engaged as a function of expiration of a reference time period.

7. A method for controlling an auxiliary gearbox used to selectively couple auxiliary equipment and a final drive assembly of a motor vehicle to a motor via a transmission, the method comprising:

receiving a request to switch engagement of a transmission input gear associated with a transmission output shaft driven by the transmission from a first output gear of the auxiliary gearbox to a second output gear of the auxiliary gearbox;

attempting to engage the transmission input gear and the second output gear of the auxiliary gearbox by locking the transmission, in response to the request, to stop rotation of the transmission output shaft; and performing, in response to determining that the transmission input gear and the second output gear are not fully engaged, at least one of (i) disengaging all clutches of the transmission to reduce torque on the transmission output shaft and (ii) placing the transmission in an unlocked neutral state, in which one clutch of the transmission is engaged, to rotate the transmission output shaft and the associated transmission input gear with respect to the second output gear.

8. The method of claim 7, wherein receiving the request comprises receiving a request to switch engagement of the transmission output shaft from a first output gear of the auxiliary gearbox associated with a drive input shaft used to drive the final drive assembly of the motor vehicle to a second output gear of the auxiliary gearbox associated with an equipment input shaft used to drive the auxiliary equipment of the motor vehicle.

9. The method of claim 7, wherein receiving the request comprises receiving a request to switch engagement of the transmission output shaft from a first output gear of the auxiliary gearbox associated with an equipment input shaft used to drive the auxiliary equipment of the motor vehicle to a second output gear of the auxiliary gearbox associated with a drive input shaft used to drive the final drive assembly of the motor vehicle.

10. The method of claim 7, comprising placing the transmission in the unlocked neutral state subsequent to disengaging all clutches of the transmission in response to determining that the transmission input gear and the second output gear are not fully engaged.

11. The method of claim 7, comprising disengaging all clutches of the transmission subsequently to placing the transmission in the unlocked neutral state in response to determining that the transmission input gear and the second output gear are not fully engaged.

12. The method of claim 7, comprising transitioning among the locking of the transmission, the disengaging of all clutches, and the placing of the transmission in the unlocked neutral state until the transmission input gear and the second output gear are fully engaged.

13. The method of claim 7, wherein determining that the transmission input gear and the second output gear are not fully engaged comprises determining that the transmission input gear and the second output gear are not fully engaged as a function of a sensor signal that indicates whether the transmission input gear and the second output gear are fully engaged.

14. The method of claim 7, wherein determining whether the transmission input gear and the second output gear are fully engaged comprises determining whether the transmission input gear and the second output gear are fully engaged as a function of expiration of a reference time period.

15. The method of claim 7, wherein the transmission control module to engage the transmission input gear and the second output gear of the auxiliary gearbox by transitioning among the locking of the transmission, the disengaging of all clutches, and the placing of the transmission in the unlocked neutral state until the transmission input gear and the second output gear are fully engaged.

16. A system for a motor vehicle having a final drive assembly and auxiliary equipment driven by a motor, the system comprising:

a transmission comprising a transmission input shaft to receive power from the motor and a transmission output shaft;

an auxiliary gearbox comprising a transmission input gear associated with the transmission output shaft, a first output gear to power one of the final drive assembly and the auxiliary equipment, and a second output gear to power the other one of the final drive assembly and the auxiliary equipment;

a sensor to generate a sensor signal to indicate that the transmission input gear and the second output gear are fully engaged;

a transmission control module to control operation of the transmission and the auxiliary gearbox, the transmission control module to engage the transmission input gear and the second output gear of the auxiliary gearbox by locking the transmission to stop rotation of the transmission output shaft, determine whether the transmission input gear and the second output gear are fully engaged as a function of the sensor signal, and to perform, in response to determining that the second output gear are not fully engaged, at least one of:

(i) disengage all clutches of the transmission to reduce torque on the transmission output shaft, and (ii) place the transmission in an unlocked neutral state, in which one clutch of the transmission is engaged, to rotate the transmission output shaft and the associated transmission input gear with respect to the second output gear.

17. The system of claim 16, wherein the first output gear powers the final drive assembly and the second output gear powers the auxiliary equipment.

18. The system of claim 16, wherein the first output gear powers the auxiliary equipment and the second output gear powers the final drive assembly.

19. The system of claim 17, wherein the transmission control module to place the transmission in the unlocked neutral state subsequent to disengagement of all clutches of the transmission in response to determining that the transmission input gear and the second output gear are not fully engaged.

20. The method of claim 16, wherein the transmission control module to disengage all clutches of the transmission subsequently to placing the transmission in the unlocked neutral state in response to determining that the transmission input gear and the second output gear are not fully engaged.

* * * * *